United States Patent [19]
Davis et al.

[11] Patent Number: 5,347,514
[45] Date of Patent: Sep. 13, 1994

[54] PROCESSOR-BASED SMART PACKET MEMORY INTERFACE

[75] Inventors: Gordon T. Davis; Donald J. Donaghy; Laurence V. Marks; Challis L. Purrington, Sr., all of Raleigh, N.C.

[73] Assignee: International Business Machines Corporation, Armonk, N.Y.

[21] Appl. No.: 37,196

[22] Filed: Mar. 26, 1993

[51] Int. Cl.$^5$ ........................................... H04L 12/02
[52] U.S. Cl. ..................................... 370/60; 370/94.1
[58] Field of Search ................ 370/85.1, 85.2, 85.3, 370/85.4, 85.5, 85.6, 85.13, 85.14, 94.1, 94.2, 60, 93, 92; 360/825.5, 825.51; 364/DIG. 1; 395/275, 425, 725, 200

[56] References Cited

U.S. PATENT DOCUMENTS

| | | | |
|---|---|---|---|
| 4,614,841 | 9/1986 | Babecki et al. | 379/98 |
| 4,622,631 | 11/1986 | Frank et al. | 364/200 |
| 5,167,035 | 11/1992 | Mann et al. | 370/85.1 |
| 5,226,039 | 7/1993 | Frank et al. | 370/60 |
| 5,237,567 | 8/1993 | Nay et al. | 370/85.1 |

Primary Examiner—Benedict V. Safourek
Assistant Examiner—Huy D. Vu
Attorney, Agent, or Firm—Stephen T. Keohane

[57] ABSTRACT

A processor-based packet memory interface for controlling the transfer of data between multiple communications channels and packet memory in a communications adapter is presented, where the communications adapter uses requestor IDs to identify transmit and receive processes. The processor-based packet memory interface is controlled by a microprocessor configured to perform read and write operations with the communications adapter. The microprocessor is further configured to reserve a plurality of blocks of memory in the packet memory so that the number of communications channels that can be supported is not limited to the number of requestor ID's that can be handled by the communications adapter. The processor-based packet memory interface also includes RAM, for use by the microprocessor, to store pointers to reserved blocks of memory in the packet memory and to temporarily store packet data for transfer between the communications channels and the communications adapter.

18 Claims, 12 Drawing Sheets

PROCESSOR-BASED SMART PACKET MEMORY INTERFACE

TECHNICAL FIELD

The present invention relates generally to communications adapters. More particularly, the present invention is directed to a packet memory interface for a communications adapter, and still more particularly to a processor-based packet memory interface.

BACKGROUND ART

Computer systems in contemporary computing environments are often interconnected using local area networks (LANs) and wide area networks (WANs) to allow computer-to-computer and processor-to-processor communications. In many environments, this networking concept is extended so that multiple LANs are networked together through the use of intermediate nodes or gateways. Thus, an integrated network may be a homogeneous network or may comprise several different types of networks interconnected through gateways or interconnected through a high bandwidth backbone network.

Devices on the network may range from simple devices such as printers, modems and terminals to intelligent devices such as processors, workstations, mainframe hosts, and network controllers. With the exchange of massive amounts of information that takes place among these networked devices the communications networks are designed to carry a wide spectrum of traffic. This traffic ranges from time-critical urgent traffic and bandwidth-critical synchronous traffic, to less time-critical asynchronous background traffic.

The traffic flowing in these networks is carried in the form of data stream segments called "packets." When a network device wishes to transmit information over the network, it sends the information in packets. Each packet generally comprises two types of information: communications-related (control) information and data. The data information is simply the actual data that one device wishes to send to another device (or devices) over the network. The control information is the information required by the communications protocol to send the packet over the network from one device to another. Control information is usually in a separate part of the packet called a "header." Control information in the header is interpreted by a communications protocol processor before the packet is passed on to the receiving application. Control information can include information such as source IDs, destination IDs, routing information, error control information, and the like.

Through the use of control information to manage the routing of the packet from its source to a specified destination, multiple unique communication paths can be defined on a single integrated network. This has the effect of creating multiple virtual channels on a single physical link. Thus multiple packets can be routed to multiple destinations over a single network.

Before a packet arrives at its destination, it may travel through several intermediate network nodes called communications adapters. At these communications adapters, the packet may be affected by several layers of software and hardware before reaching the network level protocol entity. The control information in the packet header allows the network layer entity in an intermediate node to determine to which outbound link the packet should be routed. To prevent the communications adapter from becoming a communications "bottleneck" it must be capable of processing and routing these packets at rate that is at least the projected packet arrival rate.

One design of a communications adapter uses packet memory to queue packets for processing by the adapter's microprocessor. The microprocessor processes the packet control information to determine how to route the packet. If the packet has reached its final destination, the communications adapter's microprocessor transfers the processed packet to a port that is connected to a system bus or to a system I/O channel. If the packet has not reached its final destination, the microprocessor determines to which network the packet should be routed next. The microprocessor then transfers the packet to the outbound port connected to the target network link. In both cases, a port is informed that there is a packet ready to be shipped out. The informed port moves the packet out of packet memory and starts packet transmission.

For channelized networks that handle a lot of individual virtual channels, each transmit channel requires a separate queue for storing packets in packet memory. If priority traffic is accommodated, several queues may be required for each channel. For example, when channelized interfaces such as T-1 or ISDN (Integrated Services Digital Network) are used, as many as 31 messages in each direction may be active concurrently. For the communications adapter to transfer multiple interleaved concurrent packets required by these types of channelized interfaces, separate queues must be provided for each packet. The receive portion of the packet memory uses a requestor identification (ID) to identify a segment of packet memory (e.g., 256 bytes) that is active in the receive process for a given channel. For conventional systems the number of requestor IDs available is limited by the number of bits allocated to serve that function. In a typical system only eight active requestor IDs can be valid at any one time. This has the effect of limiting the number of active channels that can be received at any one time.

Each requestor ID is actually a reference number to identify a particular transmit or receive process. In conventional communications adapters, the number of concurrent transmit and receive processes is limited to the number of requestor IDs the adapter can support. When the number of concurrent processes is limited, the number of communication channels that can be simultaneously supported is also limited.

The following scenario serves to illustrate this limitation of conventional solutions. When a communications adapter is set up to receive packet data, its processor allocates packet memory to receive packets of data. The packet memory is allocated in memory segments that are typically on the order of 256 bytes. Associated with each memory segment is a requestor ID. Subsequent memory allocations for each packet will also require this requestor ID information. From the requestor ID information, the communications adapter is able to link together all buffers belonging to the same packet. In this way, multiple interleaved packets can be received as long as the processor can supply the correct requestor ID. This mechanism can also be used for multiple interleaved packet transmission.

The receiving circuitry receives packets of data and stores them into the appropriate memory segment according to packet control information (i.e., each channel is allocated its own memory segment). The requestor ID number is used to inform the processor that the queue is filled and the packets are ready to be sent to the appropriate outbound port as discussed above. The number of concurrent active channels that can be utilized then is limited to the number of memory segments that can be identified by a unique requestor ID number.

Limiting the number of effective channels that can be handled by an integrated network in this manner is a hindrance to the type of high speed, multiple interleaved packet communication desired in today's systems. What is needed is a technique for increasing the number of concurrent interleaved packets that can be handled by a network node.

DISCLOSURE OF THE INVENTION

A system and method for extending the capabilities of communications adapters is provided herein. A communications adapter typically receives packet data at an adapter port from a communications channel and stores this data in the adapter's packet memory. The packet is queued for processing by the adapter's processor and then processed. The packet is sent via an adapter port to a communications channel such as a system bus, a system I/O channel, a target network link, or the like, based on packet control information.

According to the present invention, a processor-based packet memory interface (PMI) manages the transfer of packet data between the communications channels and the communications adapter's packet memory. The processor-based PMI uses buffer pointers and buffer table entries to allow the communications adapter to interface to a greater number of communications channels than would be feasible without the processor-based PMI.

The processor-based PMI is controlled by a microprocessor which manages the transfer of packet data and keeps track of buffer pointers and buffer table entries. Microprocessor RAM is provided as a temporary store for incoming and outgoing packet data, and as a store for buffer pointers and buffer table entries. Communications channel FIFOs are formed in the RAM for queuing outgoing packet data from the packet memory.

Depending on the processor selected, the processor-based PMI can be tied directly to the communications adapter bus. If an alternative bus configuration is selected for the processor-based PMI, interface logic can be used to integrate the alternative bus with the bus of the communications adapter.

Control logic is provided to handle arbitration for gaining access to the communications adapter. The control logic also controls interface logic to the communications adapter.

The microprocessor in processor-based PMI requests a block buffer space in packet memory. When buffer space is allocated, a pointer is returned to the microprocessor and is stored in RAM. The microprocessor continues requesting buffer space and storing pointers until a chain of available memory space is allocated. The allocated blocks are multicast, or reserved, so that they do not require a unique requestor ID for each communications channel. When data is received from a communications channel, the microprocessor stores this data in the appropriate buffer as indicated by the pointer.

When a packet is to be transmitted to a communications channel, the microprocessor first determines which channel is to be used for transmission. The microprocessor then stores the pointer(s) to the appropriate buffer(s) in a FIFO for that channel in RAM. When the packet is ready, it is transmitted.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

BEST MODE FOR CARRYING OUT THE INVENTION

1. Overview and Discussion of the Invention

The present invention is a processor-based packet memory interface (PMI) for augmenting the number of concurrent interleaved packets that can be handled by a communications adapter. The processor-based PMI has direct control over primitive commands to the adapter manager via microcode. Thus the PMI processor is able to issue primitive commands that are normally reserved for the main adapter processor, as well as primitive commands typically issued by hardware-based PMIs.

For transmit operations, this capability allows the PMI processor to create multiple transmit queues in its local memory from a single large queue in the adapter. The PMI processor can then transmit the packets as individual channels are ready for them. In other words, the PMI processor takes a single queue and breaks it up into multiple smaller queues in its outboard memory.

For receive operations, the PMI processor has the ability to request new buffers by altering the buffer pointers itself and moving buffers from one packet chain to another. Thus multiple input buffer "channels" are created and managed by the PMI processor.

According to a preferred embodiment, the processor selected for the processor-based PMI is a DSP (digital signal processing) processor. Other processors could be utilized such as a RISC (reduced instruction set computing) processor or a picoprocessor.

2. Example Environment

The processor-based PMI can be implemented as an interface to a number of different architectures configured for storing packets of data into packet memory and keeping track of that data using ID tags. One such architecture is illustrated in FIG. 1 by way of example.

Figure 1:
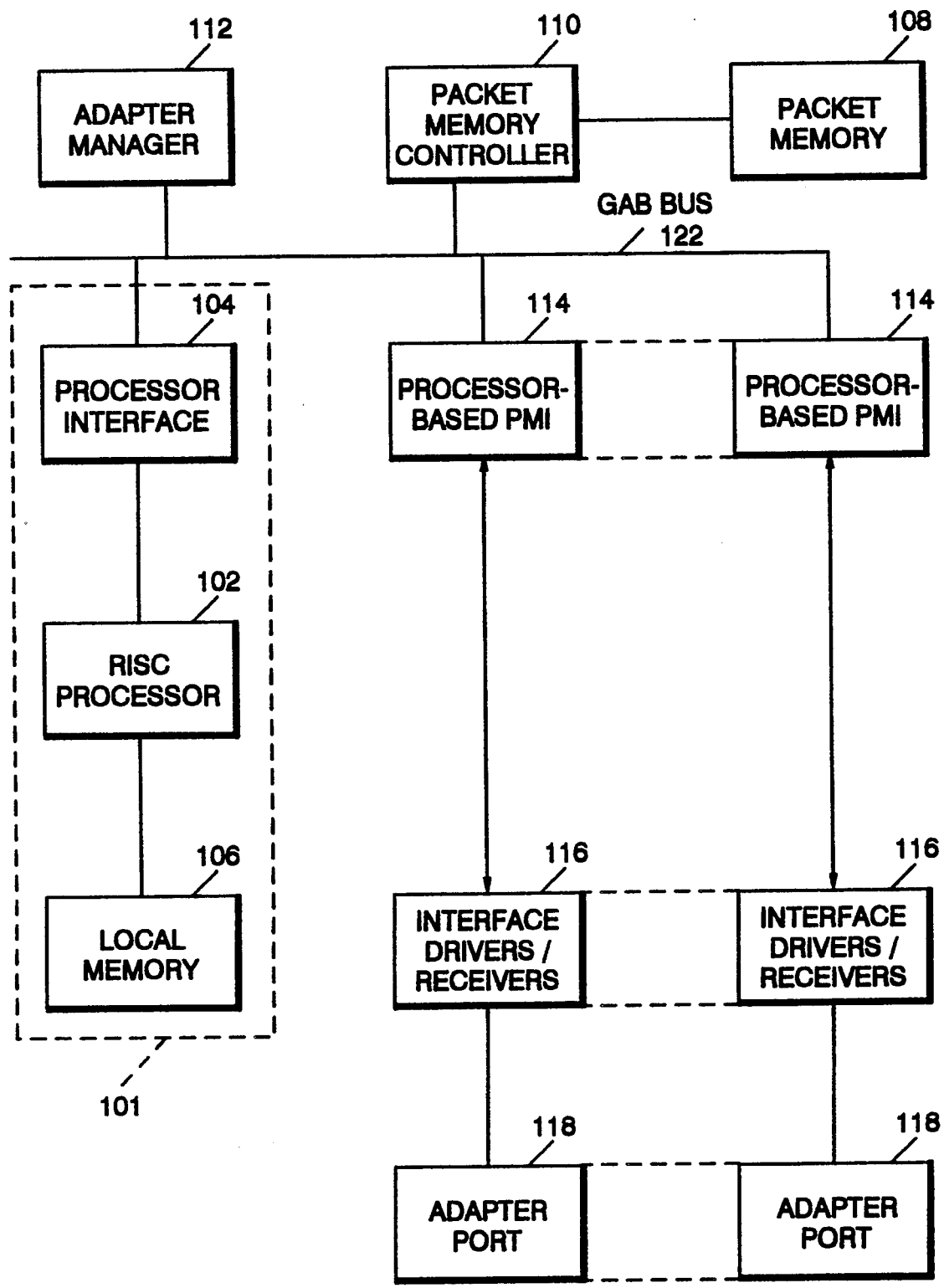
FIG. 1 is a block diagram illustrating a communications adapter having a processor-based packet memory interface according to the present invention.

FIG. 1 is a block diagram illustrating a network adapter using packet memory to store incoming and outgoing packets of data. Referring now to FIG. 1, the processor-based PMI according to the present invention will be described in terms of communications adapter environment. The communications adapter uses a processor subsystem 101 to run communications microcode in processed packet queues. In this example environment, processor subsystem 101 is based on a RISC microprocessor. Processor subsystem 101 includes a RISC processor 102, a processor interface 104, local RAM and RAM controller 106, and other auxiliary circuits essential for microprocessor operations. For simplicity, these auxiliary circuits are not shown in FIG. 1 but include hardware timers, an interrupt controller, and local memory controller.

Packets of data that arrive at an individual adapter port 118 are stored in packet memory 108 where they await disposition. Packet memory 108 generally comprises high speed random access memory (RAM). Packet memory 108 generally has an architectural limit, typically on the order of 16 megabytes. In this example environment, this memory is segmented to a set of 256-byte buffers. Packets of data are stored in one or more buffers in the packet memory and can be deleted or routed by processor subsystem 101 to one of a plurality of adapter ports 118.

A packet memory controller 110 provides interface functions to an adapter bus (referred to as "GAB bus 122") for packet memory 108. Packet memory controller 110 isolates packet memory 108 from GAB bus 122 requirements such as parity generation and response generation.

GAB bus 122 is a synchronous bus at the physical signal interface level. All bus signals are synchronized to a bus clock. However, actual bus operations are asynchronous and act in a command/response fashion. The speed of GAB bus 122 is a critical performance parameter and needs to match adapter input requirements. Adapter manager 112 contains several functional components that perform adapter management functions. These include an adapter manager kernel, an arbiter for GAB bus 122, a monitor for GAB bus 122, and adapter manager local memory. These individual components are not illustrated in FIG. 1 for simplicity. Adapter manager 112 responds to primitive commands from each PMI 114.

The adapter manager kernel implements data structures in packet memory 108 and performs all data management functions. Three main data structures are buffers, packets, and queues. Based on these structures, adapter manager 112 performs several important functions such as packet traffic control, buffers/packet management, and input/output queue scheduling.

The adapter manager arbiter grants control of GAB bus 122 to the requestor with the highest priority. The adapter manager monitor performs GAB bus monitoring functions such as parity checking and bus cycle length checking.

A processor-based PMI 114 is provided for each port in the communications adapter. Processor-based PMI 114 is connected to GAB bus 122 and provides a mechanism for transferring packets to and from packet memory 108. For example, a Microchannel ® interface connected to processor based PMI 114 can provide a PS/2 ® system (available from International Business Machines in Armonk, N.Y.), a path for delivering packets to a communication network. Processor-based PMI 114 provides attachment to an external network via interface drivers and receivers 116. Interface drivers/receivers 116 can be selected to provide a number of different interfaces such as RS/422, X.21, V.35, RS-449, T-1, ISDN, and the like.

One key function of processor based PMI 114 is to obtain buffers in packet memory 108 for storing arriving packets in packet memory 108. The buffers are obtained from adapter manager 112. Processor-based PMI 114 can also read packets from packet memory 108 and pass them to an external network via interface driver/receivers 116.

According to this example environment, processor-based PMI 114 is the only interface between an individual adapter port 118 and GAB bus 122.

In the example environment described above, GAB bus 122 uses hardware-based state machines to control data movement and memory allocation. This relieves processor system 101 from controlling these tasks and maximizes the performance of communications adapter. As a result, to interface to GAB bus 122, conventional packet memory interfaces typically use relatively complex logic chip (or chip set) that includes FIFO buffers as well as hardware state machines to control transfers to and from packet memory 108. Additional state machines are also required in each interface to communicate with adapter manager 112.

When connecting to interfaces such as RS-422, X.21, T-1, and the like, the required throughput is significantly lower than the available bandwidth on GAB bus 122. Thus, an opportunity is provided to greatly simplify processor-based PMI 114 design by migrating hardware functions into microcode on a high-speed output processor such as a digital signal processor (DSP). In a preferred embodiment, a DSP is used to implement many of the functions previously performed by hardware state machines in conventional packet memory interfaces. For example, the DSP can implement low-layer functions such as CRC, bit insertion/deletion, flag detection, etc. The same DSP can perform many functions that other adapters reserve for hardware state machines such as the setup of data transfers that map directly into GAB bus 122 (address and data buses). This gives the DSP direct control of both data transfers to/from packet memory 108 and primitive commands to adapter manager 112 to request data for transmission, request buffers for reception, and queue packets to other devices on the bus.

Hardware design can be further simplified by transferring data across GAB bus 122 one word at a time rather than data streaming of bursts. Data streaming is required for higher speed interfaces to achieve the required bus throughput. It should be noted that this mode of operation requires FIFO buffers and more complex sequencing logic. In a preferred embodiment, this complexity is eliminated in processor based PMI 114 because the provided bandwidth is adequate even without using data streaming bursts.

3. Read and Write Operations With Packet Memory

Figure 2:
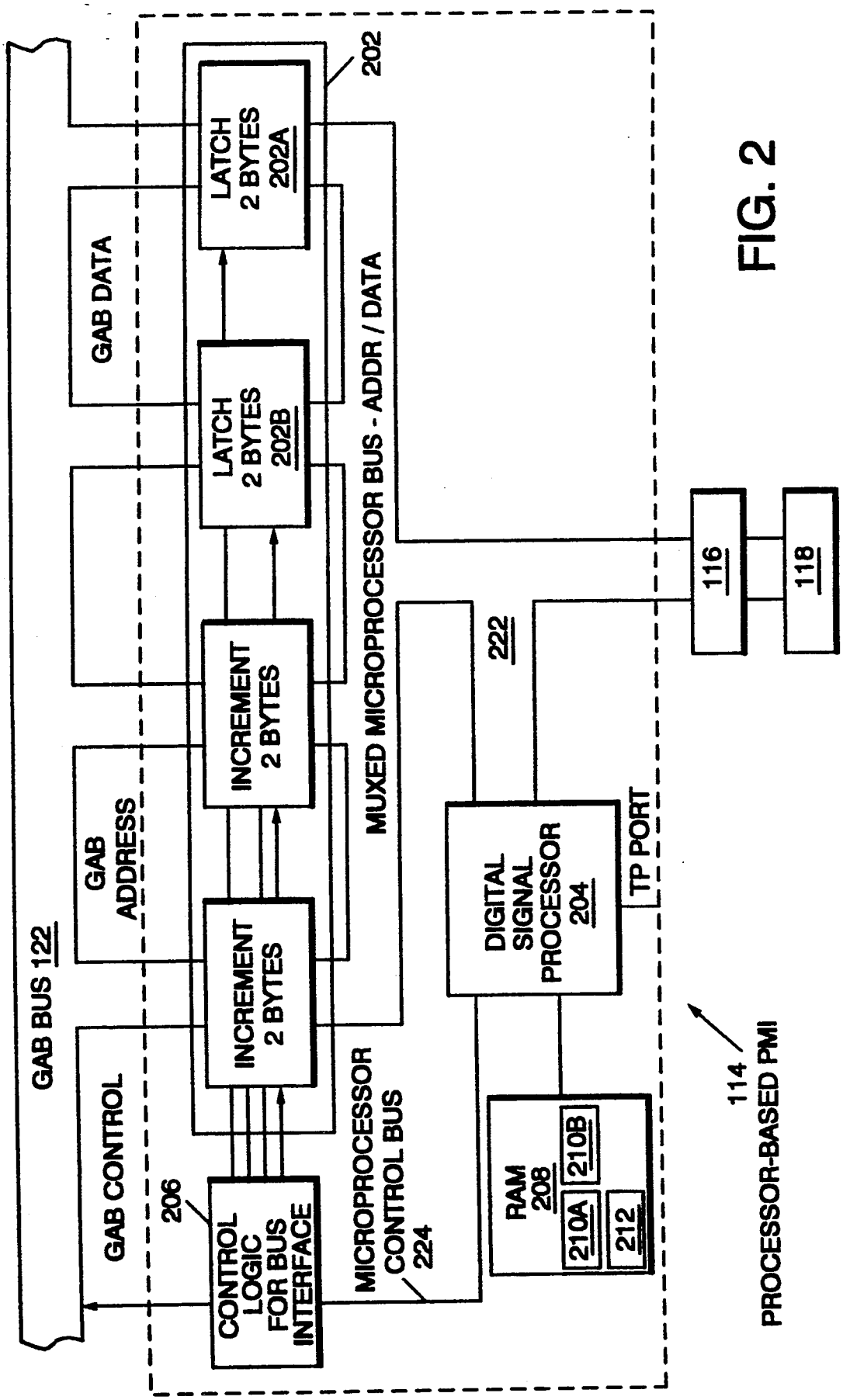
FIG. 2 is a block diagram illustrating a processor-based packet memory interface according to the present invention.

FIG. 2 is a block diagram illustrating a hardware design of processor-based PMI 114 according to a preferred embodiment. Interface logic 202 is used to connect processor-based PMI 114 to GAB bus 122. Interface logic 202 comprises a set of bi-directional latches that have tri-state outputs.

A microprocessor bus 222 provides for the transfer of address and data information between port(s) 118 and interface logic 202. Microprocessor bus 222 can be granted to a digital signal processor 204 (referred to as "DSP 204") for the duration of a data burst (typically 33 cycles of 320 nanoseconds each). The first cycle provides address information for GAB bus 122 transfers. Address and data fields on microprocessor bus 222 are combined to generate the GAB bus 122 address. After the first cycle, each pair of 16-bit cycles on microprocessor bus 222 is translated into a single 32-bit transfer on GAB bus 122.

Control logic 206 controls the output state of interface logic 202. Control logic 206 can tri-state the outputs of interface logic 202. Control logic 206 is actually controlled by DSP 204 via a microprocessor control bus 224.

Alternative architectures may be chosen for processor-based PMI 114. For example, a 32-bit microprocessor bus 222 may be chosen to interface a 32-bit adapter bus. Also, additional processors (DSP 204) may be tied to microprocessor bus 222 to handle multiple-port applications.

In a preferred embodiment, microprocessor bus 222 is used because this allows interface to an existing, available DSP processor with a minimum of logic. It is obvious to one of ordinary skill in the art how this design could be extended to imbed the GAB bus in the DSP chip and eliminate microprocessor bus 222.

Examples of microprocessor bus 222 can be a Microchannel bus, an Industry Standard Architecture (ISA) bus, an INTEL 80186 bus, or the like. These are examples of buses that are embedded in DSP processors and could be used to interface to GAB bus 122. It will be obvious to one of ordinary skill in the art how each of these buses, and any other bus that may be selected, can be interfaced to GAB bus 122 or to any other bus used for the communications adapter. Alternatively, DSP 204 can be interfaced directly to the communications adapter bus (GAB bus 122).

The operation of processor-based PMI 114 will now be described in terms of the sequence of events that occurs for writing to and reading from packet memory 108.

Figure 3:
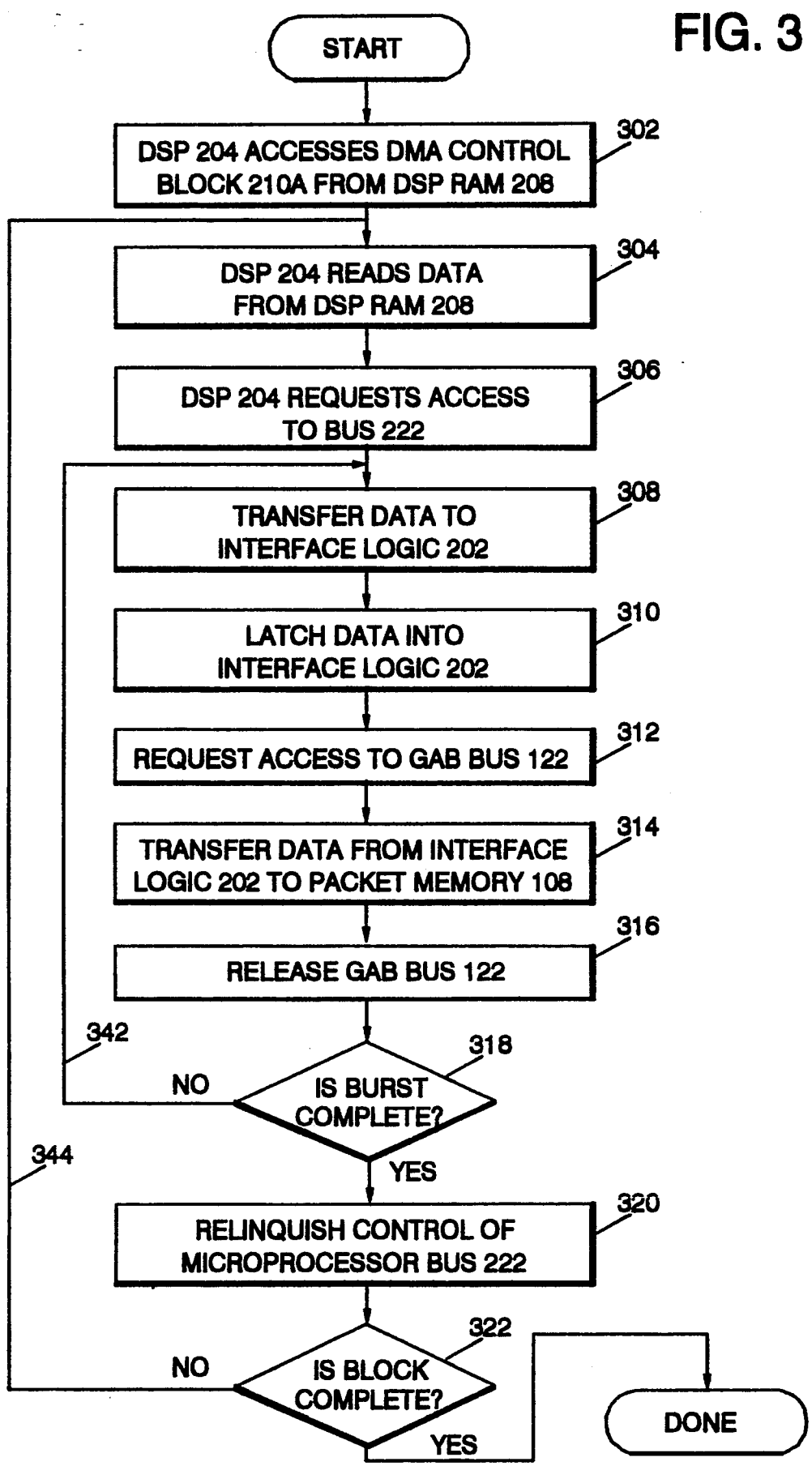
FIG. 3 is a flowchart illustrating the steps involved in writing to packet memory.

FIG. 3 is a flow chart illustrating the steps involved in writing to packet memory 108. Referring to FIG. 3, in a step 302, DSP 204 accesses a DMA (direct memory access) control block 210A from DSP RAM 208. In a step 304, DSP 204 reads data to be written to packet memory 108 from DSP RAM 208. In a preferred embodiment, DSP 204 can read up to 32 bytes of data from DSP RAM 208. In a preferred embodiment, code executing in DSP 204 sets up the block transfer, and hardware sequencers manage the individual bus cycles required to complete the transfer.

To transfer this data to packet memory 108, DSP 204 must first access microprocessor bus 222. Thus, in a step 306, DSP 204 requests access to microprocessor bus 222. When access is granted, DSP 204 begins transferring data to interface logic 202 in a step 308.

Figure 4:
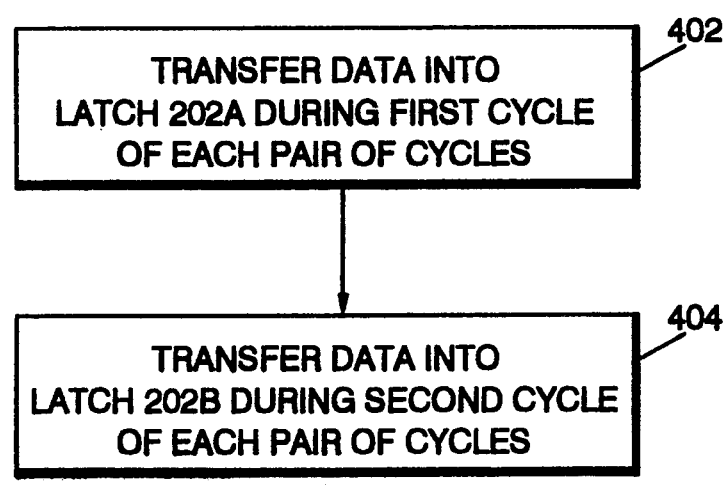
FIG. 4 is a flowchart illustrating the steps used to latch data into interface logic of the processor-based packet memory interface.

In a step 310, the data is latched into interface logic 202. This process is illustrated in the flow chart of FIG. 4. Referring now to FIGS. 3 and 4, in a step 402, during the first cycle of each pair of bus cycles, the data is transferred into a 2-byte latch 202A for the low order half of GAB bus 122. In a step 404, during the second cycle of each pair of cycles, data is transferred into a 2-byte latch 202B for the high order half of GAB bus 122.

In a step 312, while this second transfer (step 404) is in progress, control logic 206 requests ownership of GAB bus 122. After the data is latched into interface logic 202, DSP 204 relinquishes control of microprocessor bus 222.

When GAB bus 122 ownership is granted, control logic 206 completes the transfer of data from interface logic 202 to packet memory 108. This occurs in a step 314.

Address latches 202A, 202B include an increment function that is activated after each transfer. As a result of this increment function, new address information is not required from DSP 204 for each cycle of microprocessor bus 222. Note that GAB bus 122 is released after each transfer (see step 316), while microprocessor bus 222 continues to the next cycle in the block transfer. In other words, microprocessor bus 222 writes overlap the GAB cycle corresponding to microprocessor bus 222 transfer. If gaining access to GAB bus 122 is delayed, the next microprocessor bus cycle is still started, but one or more wait states are inserted to compensate for delayed access to GAB bus 122.

For burst transfers, steps 308 through 316 are repeated until the burst is complete. In a preferred embodiment, the maximum number of bytes written in a burst is 32. This is illustrated by decision box 318 and feedback loop 342.

For block transfers, transmission of the multiple-byte bursts (32 in a preferred embodiment) is repeated until the block transfer is complete. This is illustrated by decision block 322 and feedback arrow 344. In a preferred embodiment, 256 bytes is the maximum number of bytes per block.

Figure 5:
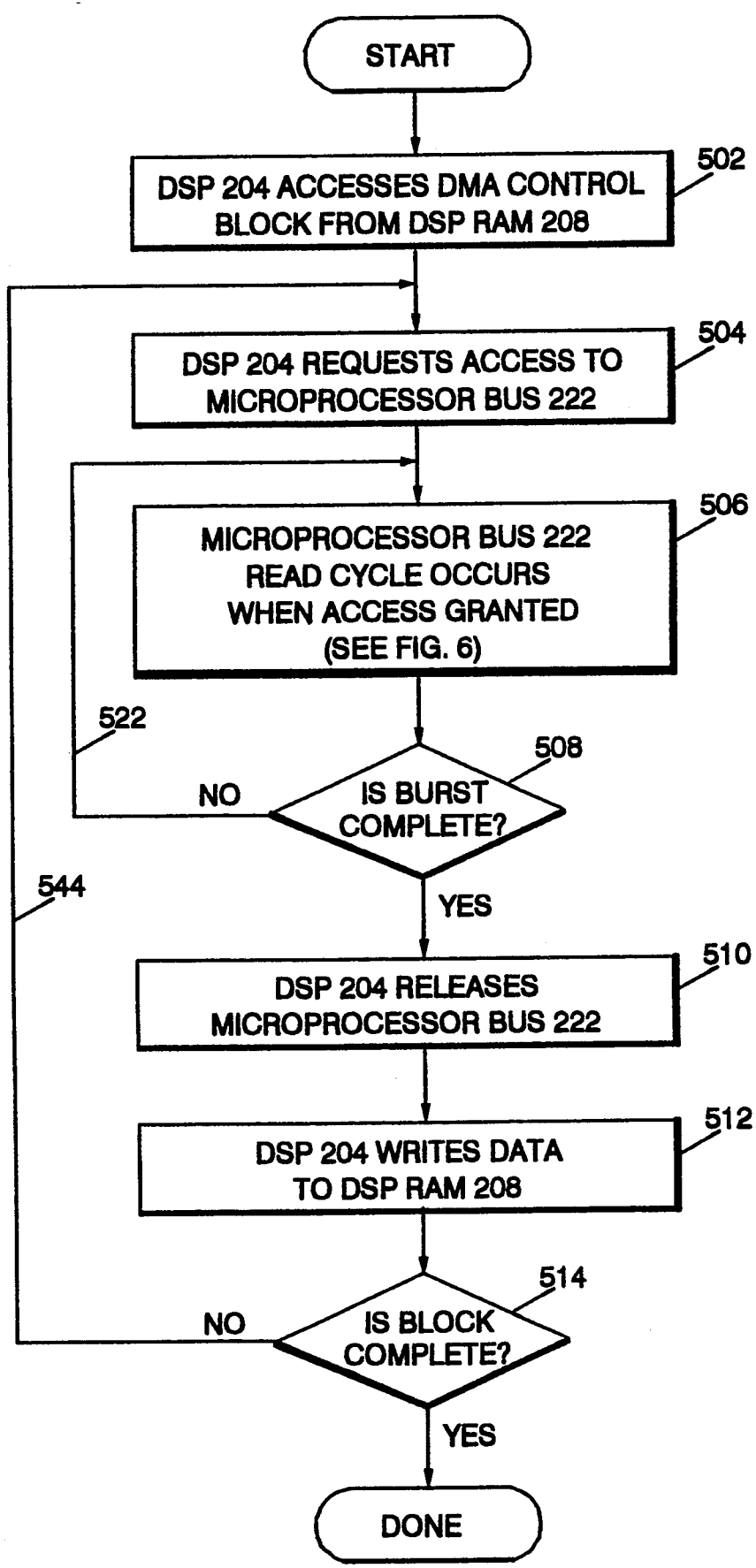
FIG. 5 is a flowchart illustrating the steps involved with reading packets from the packet memory.

Read cycles occur in a similar fashion. FIG. 5 is a flow chart illustrating the events that occur for a read cycle. Referring now to FIGS. 2 and 5, the steps involved with reading packets from packet memory 108 will now be described. In a step 502, DSP 204 accesses a DMA control block 210B from DSP RAM 208. DSP 204 must now access microprocessor bus 222. Thus, in a step 504, DSP 204 requests access to microprocessor bus 222.

Figure 6:
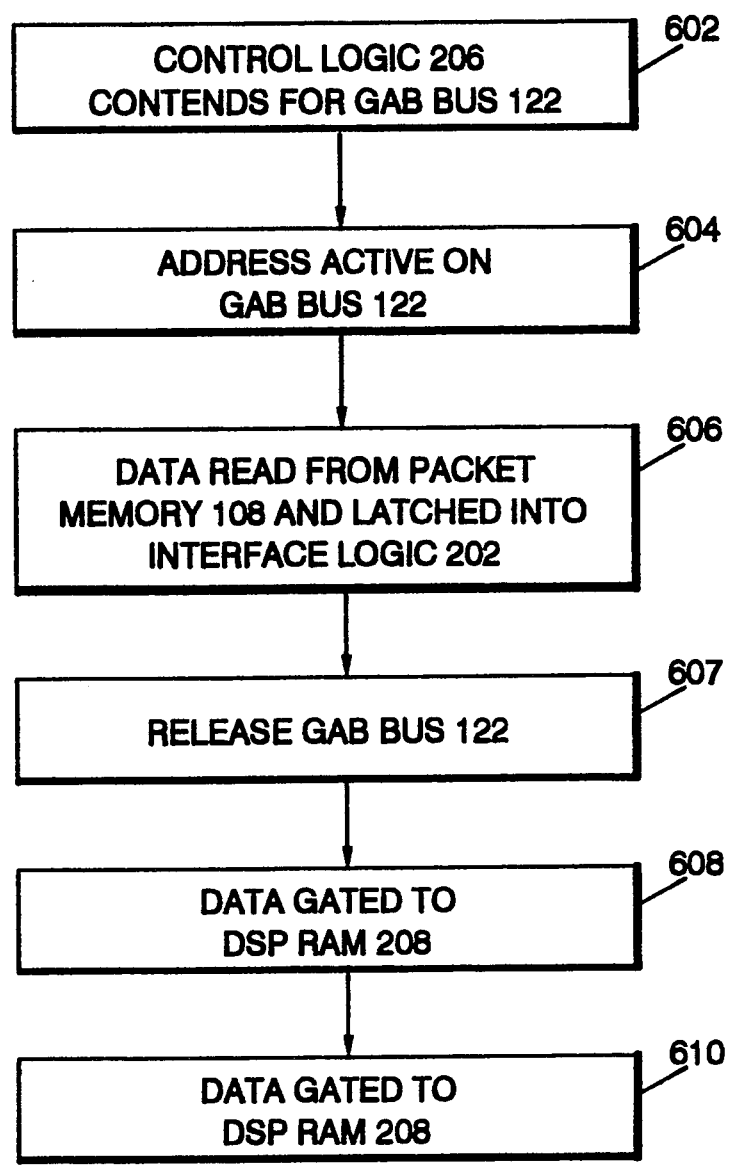
FIG. 6 is a flowchart illustrating the steps involved with a microprocessor bus read cycle.

When access is granted, a microprocessor bus 222 read cycle takes place as illustrated in a step 506. The elements of this read cycle are illustrated in FIG. 6. Referring now to FIGS. 2, 5 and 6, the microprocessor bus 222 read cycle of step 506 will now be described. In a step 602, control logic 206 contends for control of GAB bus 122. When control is obtained, the read cycle begins immediately. In a step 604 an address is activated on GAB bus 122 for reading the appropriate data. In a step 606, the data is read via GAB bus 122 and latched into interface logic 202. During a step 607 interface logic 202 releases GAB bus 122. During steps 602, 604, 606 and 607, microprocessor bus 222 is in one or more wait states. Thus, up until this point, microprocessor bus 222 is held.

In a step 608, the data in interface logic 202 is gated to DSP RAM 208 by completing the cycle. In a step 610 any remaining bits are gated to DSP RAM 208. For example, if GAB bus is 32 bits wide and microprocessor bus 222 is 16 bits wide, 32 bits are latched into interface logic 202 and transferred in two cycles (steps 608 and 610), 16 bits at a time. Note that microprocessor bus 222 read may be extended with wait states if GAB arbitration delays the transfer of the packet from packet memory 108.

For burst data transfers, step 506 is repeated until the burst is complete. This is illustrated by decision block 508 and feedback path 522.

After the last microprocessor bus 222 read operation, microprocessor bus 222 is released by DSP 204. This is illustrated by box 510. In a step 512, DSP 204 writes the data to DSP RAM 208. In a preferred embodiment, up to 32 bytes of data may be written to DSP RAM 208 in one burst.

For block transfers, steps 504 through 512 are repeated until the block is transferred. In a preferred embodiment, the block may be up to 256 bytes.

4. Operations With A Channelized Adapter

One advantage of the processor-based PMI 114 is that it can be used to transfer information between the adapter and a communications network on numerous channels. To perform this function during transmit operations, processor-based PMI 114 has the capability to take data from a single queue and split them into multiple queues.

In actuality, in a preferred embodiment, processor-based PMI 114 takes pointers to the data and queues these pointers into multiple transmit channels. When the channel is ready for the data to be transmitted, it is retrieved from packet memory 108 at the location pointed to by the pointer, and transmitted. In this embodiment, the adapter thinks the data is sent when the pointer is retrieved. Therefore, it is important that the packet not be erased from packet memory 108 until it is actually sent. This can be accomplished by having DSP 204 tell adapter manager 112 when to discard the package. Alternatively, the packet can be destroyed when an acknowledge signal is received from the destination.

Figure 7:
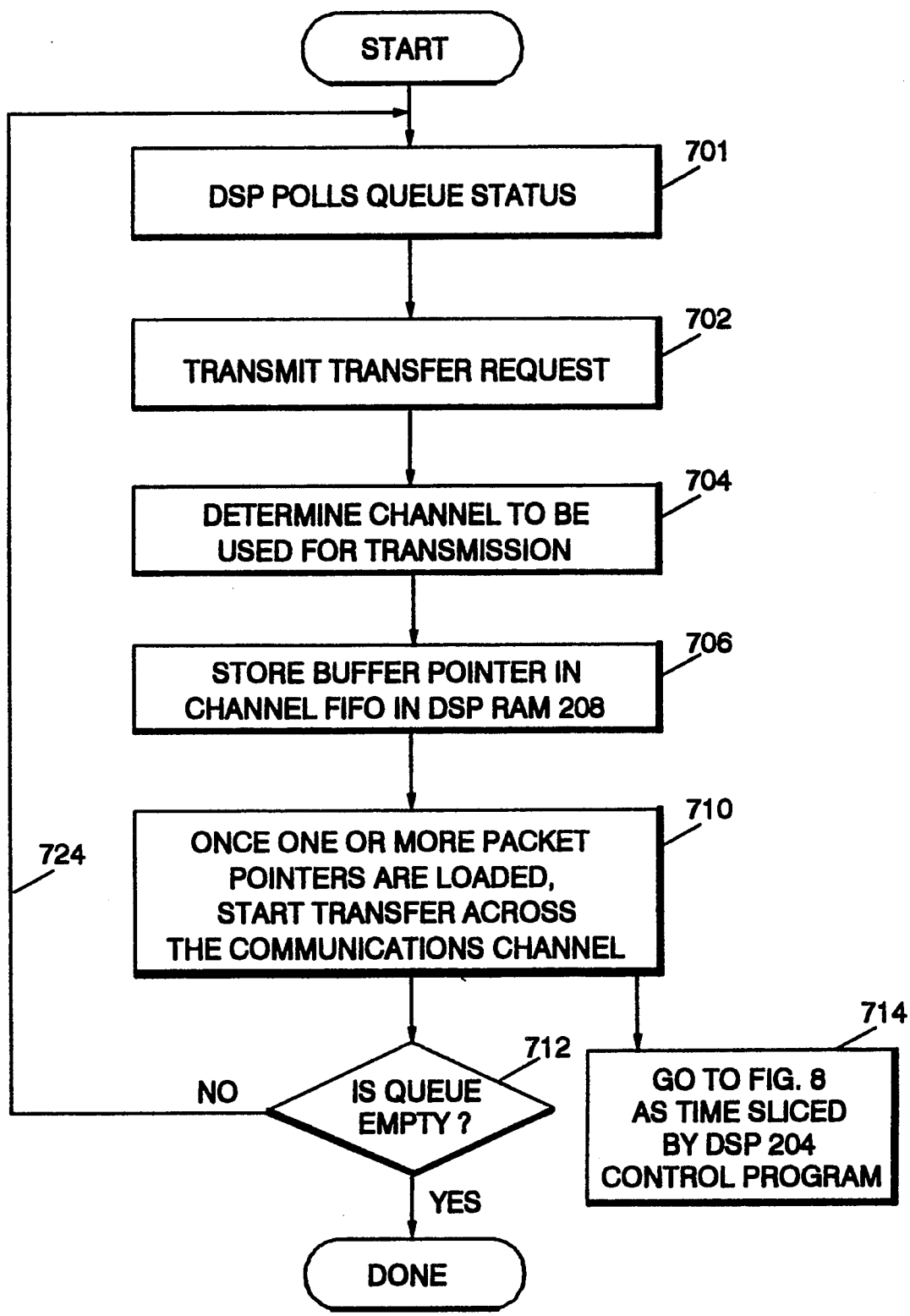
FIG. 7 is a flowchart illustrating the steps used to transfer information with a channelized adapter.

The transmission of data packets from packet memory 108 will now be described in greater detail. FIG. 7 is a flow chart illustrating the control steps used for channelized operation. Referring now to FIGS. 1, 2 and 7, RISC processor 102 places packet data in a queue to be transmitted over an external network via an adapter port 118. DSP 204 detects this request in a step 701 by polling the queue status. When packets are detected in a transmit queue, DSP 204 issues a transmit request primitive to adapter manager 112 in a step 702. Adapter manager 112 responds with a pointer to the control block of the packet to be transmitted. DSP 204 retrieves and examines the packet control block and determines the channel that is to be used for transmission. This determination occurs in a step 704.

In a step 706, the pointer is retrieved from packet memory 108 and stored in DSP RAM 208. More specifically, the pointer is stored in a channel FIFO (first-in-first-out buffer) designated for the correct channel. Only the pointer is retrieved because DSP RAM 208 is static RAM. Due to the cost associated with this type of memory, it would not be cost effective to provide enough memory to store all of the data packets retrieved.

If there are more packets in the queue, the pointers for those packets are stored in the channel FIFO as well. Once one or more packet pointers are loaded into the FIFO, transfer across the communications channel is started in a step 710. Note that if additional space in the FIFO is required, the channel FIFO may be extended into packet memory 108.

Figure 8:
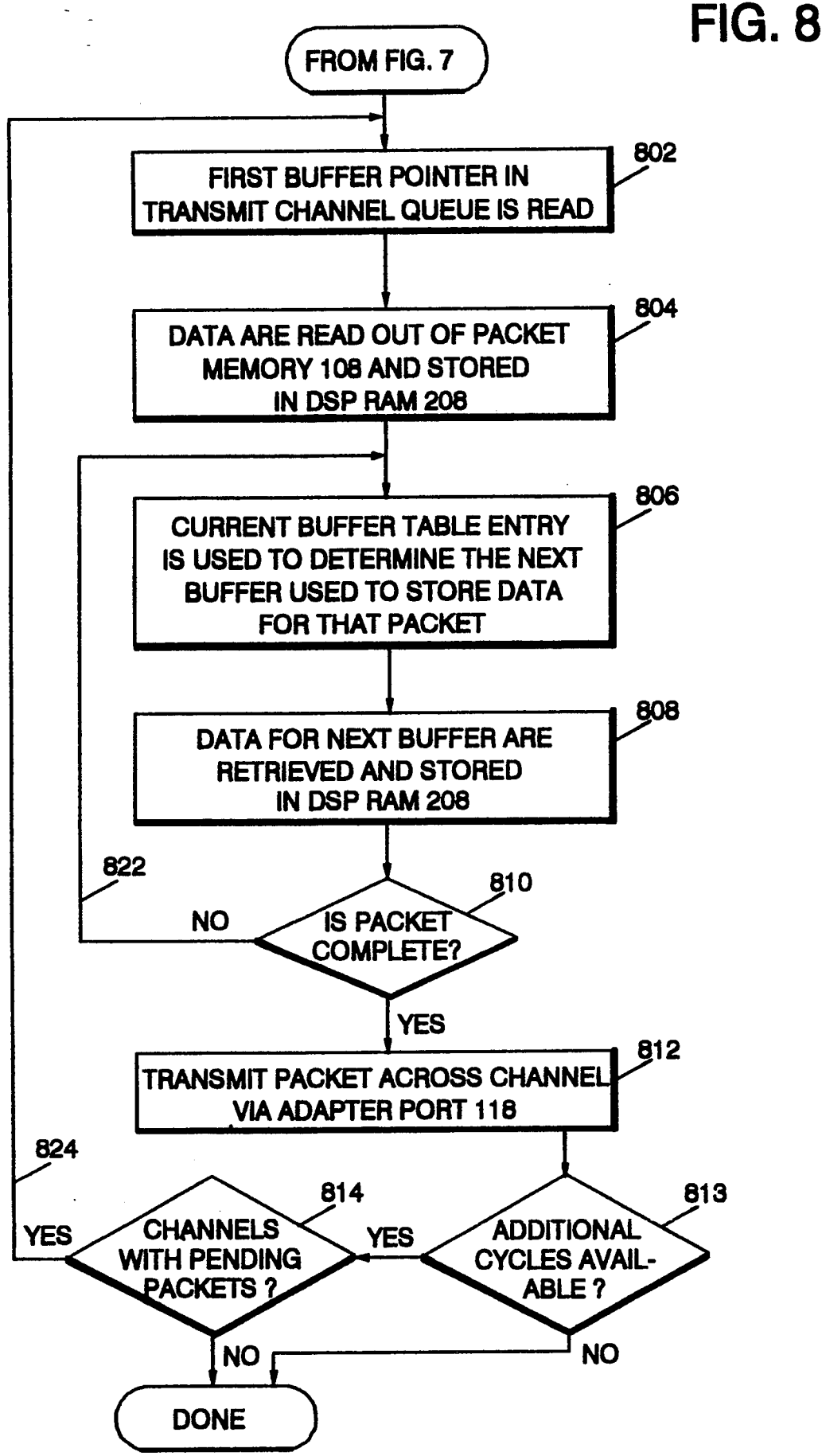
FIG. 8 is a flowchart illustrating the steps involved with transmitting data across multiple communications channels.

Once a channel is allocated for transmission, DSP 204 operations are time-sliced. DSP 204 uses the method illustrated in FIG. 7 to retrieve data and place it into a circular buffer, and uses the method that will be described with respect to FIG. 8 to fetch data out of the circular buffer and transmit that data across a communications channel. Thus, once step 710 is completed, DSP 204 may perform the method described in FIG. 8 to transmit a packet across the communications channel. This is illustrated by step 714. FIG. 8 will be discussed in more detail below.

If the adapter has more data in the transmit queue, the process begins again with step 701. If no more data remains to be transmitted, the operation is complete until another packet is placed in the queue. This is illustrated by decision block 712 and path 724.

As a result of the method described above, transmit channel queues are constantly being filled with packet data to be transmitted (or the pointer thereto). Because the channels are treated like queues, additional packets can be retrieved and stored in the appropriate transmit channel queue, even before a previous packet is sent. Thus, operations of GAB bus 122 and microprocessor bus 222 are not dependent on the "external" operations of actually transmitting data packets onto a communications channel.

The above discussion describes how packet data (actually represented by pointers) is queued into multiple output queues for transmission across multiple channels. The actual transmission of this data is discussed in more detail with respect to the flow chart of FIG. 8. FIG. 8 illustrates the steps involved with the actual data transfer. Referring now to FIGS. 1, 2 and 8, in a step 802, when a communications channel is ready to transmit data, a first buffer pointer in the transmit channel queue in DSP RAM 208 is read. In a step 804, the data associated with this pointer are read out of packet memory 108 and stored in DSP RAM 208.

In a step 806, the current buffer table entry is used to determine the buffer table entry for the next buffer in the packet. In a step 808, the data in this next buffer are retrieved and stored in DSP RAM 208. Steps 806 and 808 continue until the last data in the packet have been retrieved from packet memory 108. This is illustrated by decision block 810 and loop 822.

In a step 812, when the packet is complete, it is transmitted across the appropriate communications channel via port 118. Step 812 may be overlapped with steps 806 and 808 to minimize buffer requirements and latencies in DSP 204. In a step 813, the control program determines if additional processor cycles are available during which additional packets may be transmitted. If not, the process is done. If additional processor cycles are available, the operation continues with a step 814. Steps 802 through 813 are repeated for each transmit channel queue with pending packets. This is illustrated by decision block 814 and path 824. The read operations associated with retrieving data for the packets take place as described above with reference to FIG. 3.

Through the use of pointers to manage the transfer of packet data as described above, the processor-based PMI 114 can support communications to a greater number of available communications channels than could otherwise be supported by the communications adapter. This is because the pointers used by processor-based PMI 114 allow DSP 204 to manage packets of data and keep track of which packets belong to which communications channel. In this way, DSP 204 can send packets to at least one of a plurality of available communications channels where the number of available communications channels is greater than could otherwise be supported by the communications adapter requestor IDs.

Figure 9:
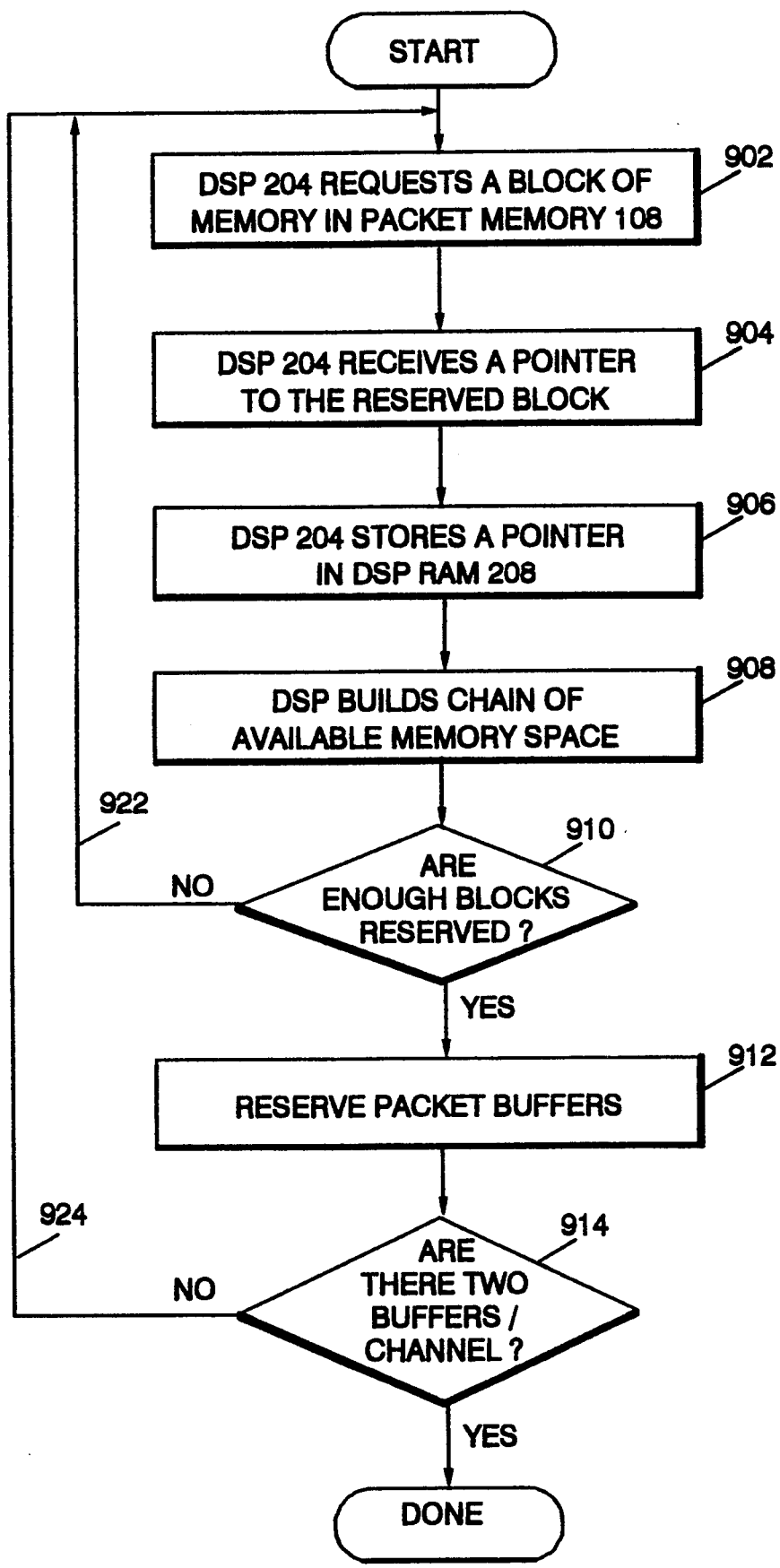
FIG. 9 is a flowchart illustrating the steps involved with receiving packets with a channelized adapter.

Storing received packets in packet memory 108 occurs in a similar fashion. Data channel housekeeping is maintained through the use of pointers. FIG. 9 is a flow chart illustrating the method of receiving packets for a channelized adapter. Referring now to FIGS. 1, 2, and 9, in a step 902, DSP 204 requests that a block of memory be reserved in packet memory 108 that can be used to store incoming data. In response, adapter manager 112 reserves this block and returns a first buffer pointer to DSP 204. In a step 904, DSP 204 receives the buffer pointer. In a step 906, the first buffer pointer is stored in DSP RAM 208 as a buffer pointer in a "free-buffer-pool." In a preferred embodiment, the block of memory is 256 bytes. DSP 204 can build a chain of available memory space using pointers to reserved blocks as illustrated by step 908. If enough blocks are reserved, the operation continues at step 912 as illustrated by decision block 910. If not, steps 902 to 908 can be repeated as necessary to reserve at least two blocks of memory as illustrated by feedback loop 922.

In conventional PMI implementations, each block of memory reserved had an associated requestor ID (RID). Because adapter manager 112 can only handle eight (8) active RIDs at any one time, this would ordinarily be a problem. Since typically at least two packets may be active in each channel at any given time, if all eight (8) RIDs were in use, another RID, and hence another block of memory, could not be created until all the data in an existing block is placed on a transmit queue for transmission to another device or bus (i.e. until the data are "enqueued"). Hence no more than eight channels could be supported.

However, this problem is resolved by reserving the packet buffers in a step 912. Reserving is a method for setting the buffer aside without enqueuing the data therein and without returning it to the free buffer pool managed by adapter manager 112. This, then, reserves the buffer for future use while freeing the RID for additional uses. In other words, as a result of reserving, a RID is made available for identifying another block without throwing away the data in an existing block.

Because the present invention overcomes the RID limitation, the communications adapter is able to receive, store in memory, and process/retransmit, packets of data from a greater number of communications channels than the communications adapter could previously support.

The steps above are repeated so that there are two empty buffers per channel. This is illustrated by a decision block 914 and a loop 924. The philosophy behind this is that one buffer is used to receive data while the second buffer is in use. In this manner data operations for a particular channel can occur while an additional data packet is being received. Multiple RIDs may be used to process several passes through the loop formed by decision block 914 and path 924 in order to expedite the process of reserving buffers.

Figure 10:
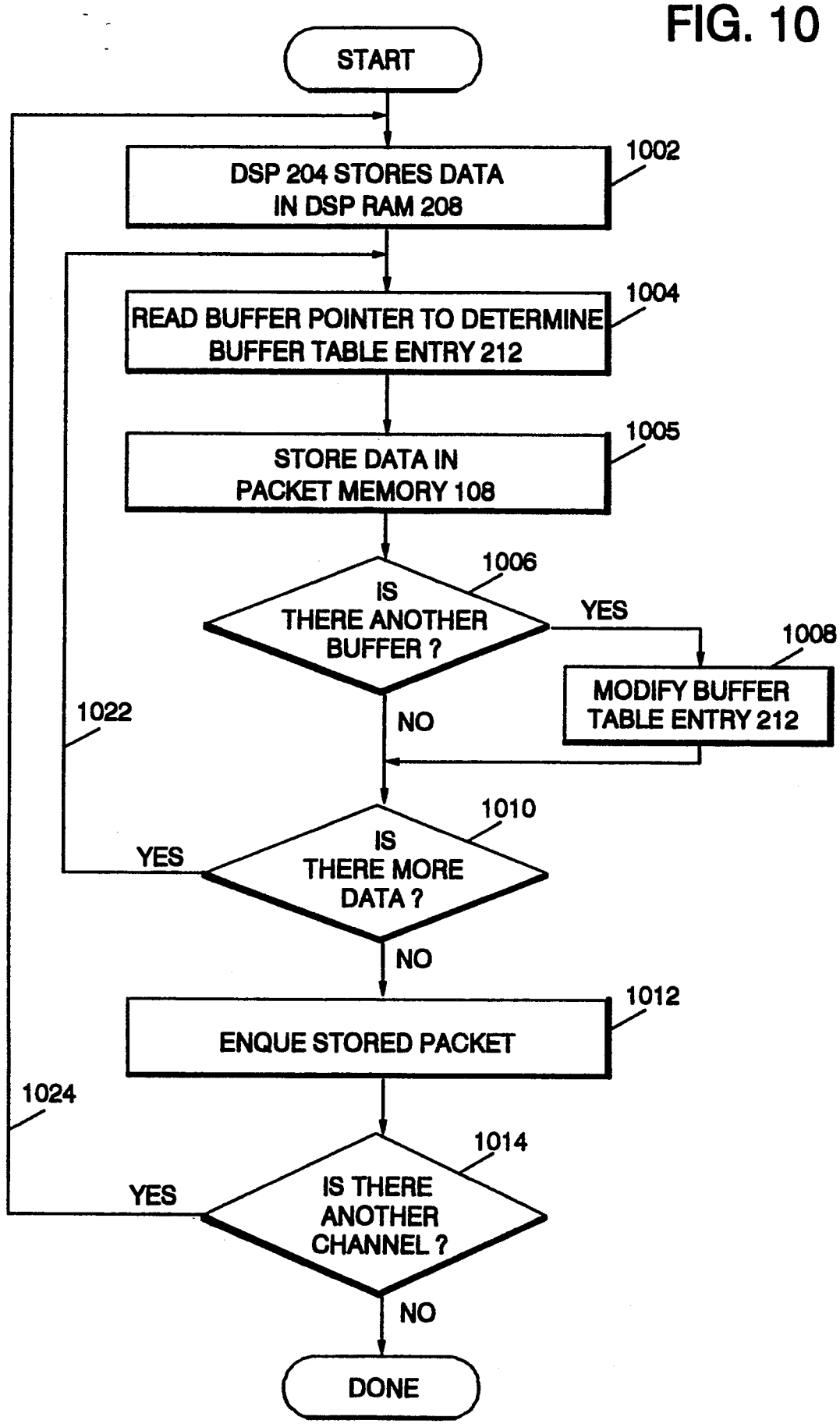
FIG. 10 is a flowchart illustrating the steps involved with receiving data at adapter ports of a communications adapter.

FIG. 10 is a flow chart illustrating the steps involved with receiving data at adapter port(s) 118. Referring now to FIGS. 1, 2, and 10, in a step 1002, when data is received, it is stored in DSP RAM 208. In a step 1004, DSP 204 reads the first buffer pointer from the free buffer pool to determine a buffer table entry 212 for the buffer to be used for that data. Buffer table entry 212 tells DSP 204 where to send received data. Then, the data is transferred to the location specified by buffer table entry 212 in a step 1005. The data transfer occurs as described above with respect to FIG. 3.

Buffer table entry 212 includes fields that indicate whether another buffer is concatenated onto the buffer to which buffer table entry 212 points. The fields of buffer table entry 212 are modified to remove that buffer from the free-buffer pool and associate it with a specific packet.

If there is additional data in the packet that have not been stored, steps 1004 through 1008 are repeated until the entire packet has been stored. This is indicated by decision block 1010 and loop 1022.

In a step 1012, the packet that has been stored is enqueued for further processing by RISC processor 102 or by another PMI 114.

If there are one or more additional channels with pending data, steps 1002 through 1012 are repeated for each channel. This is indicated by a decision block 1014 and loop 1024. In this manner, all data being received in each channel are stored in the buffer as packet data and the packets enqueued to the appropriate destination.

It should be noted that operations for multiple channels may be interleaved.

Figure 11:
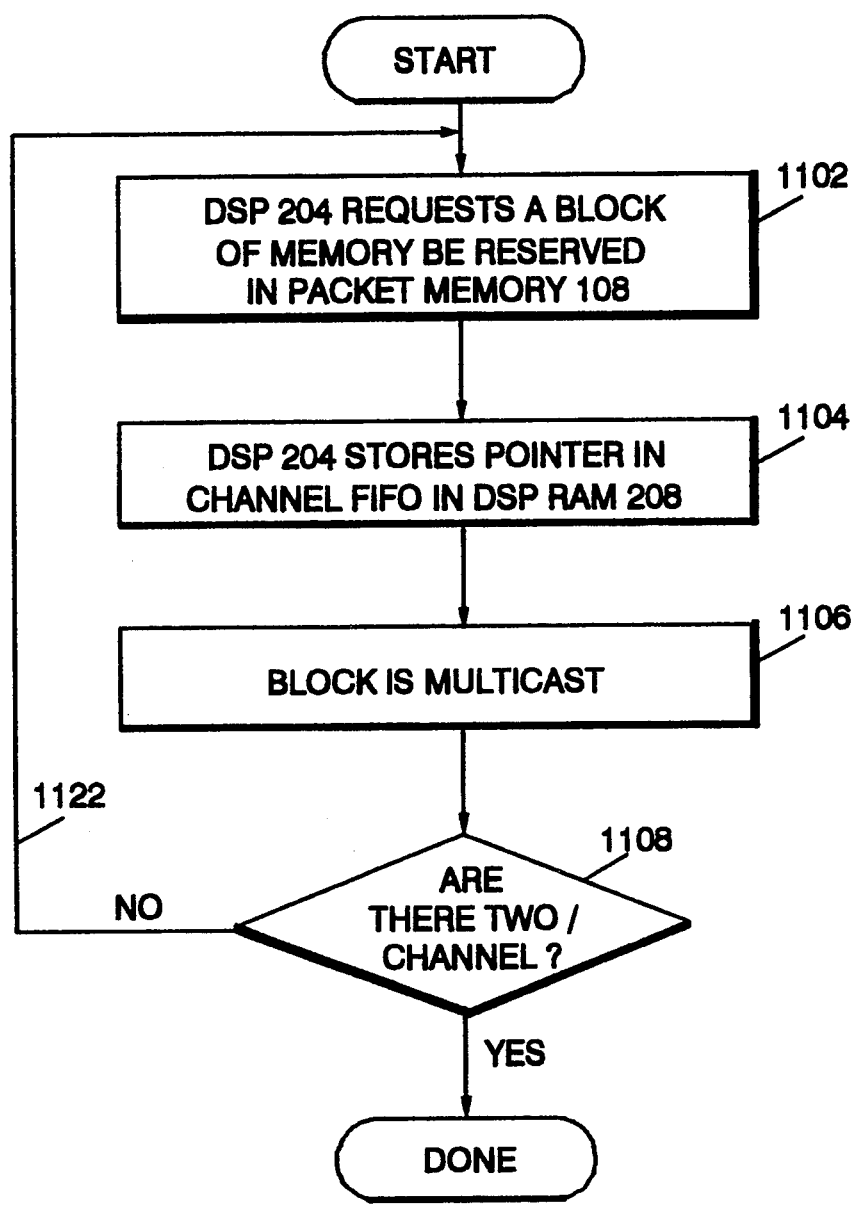
FIG. 11 is a flowchart illustrating the steps involved with storing received packet data for a channelized adapter.
Figure 12:
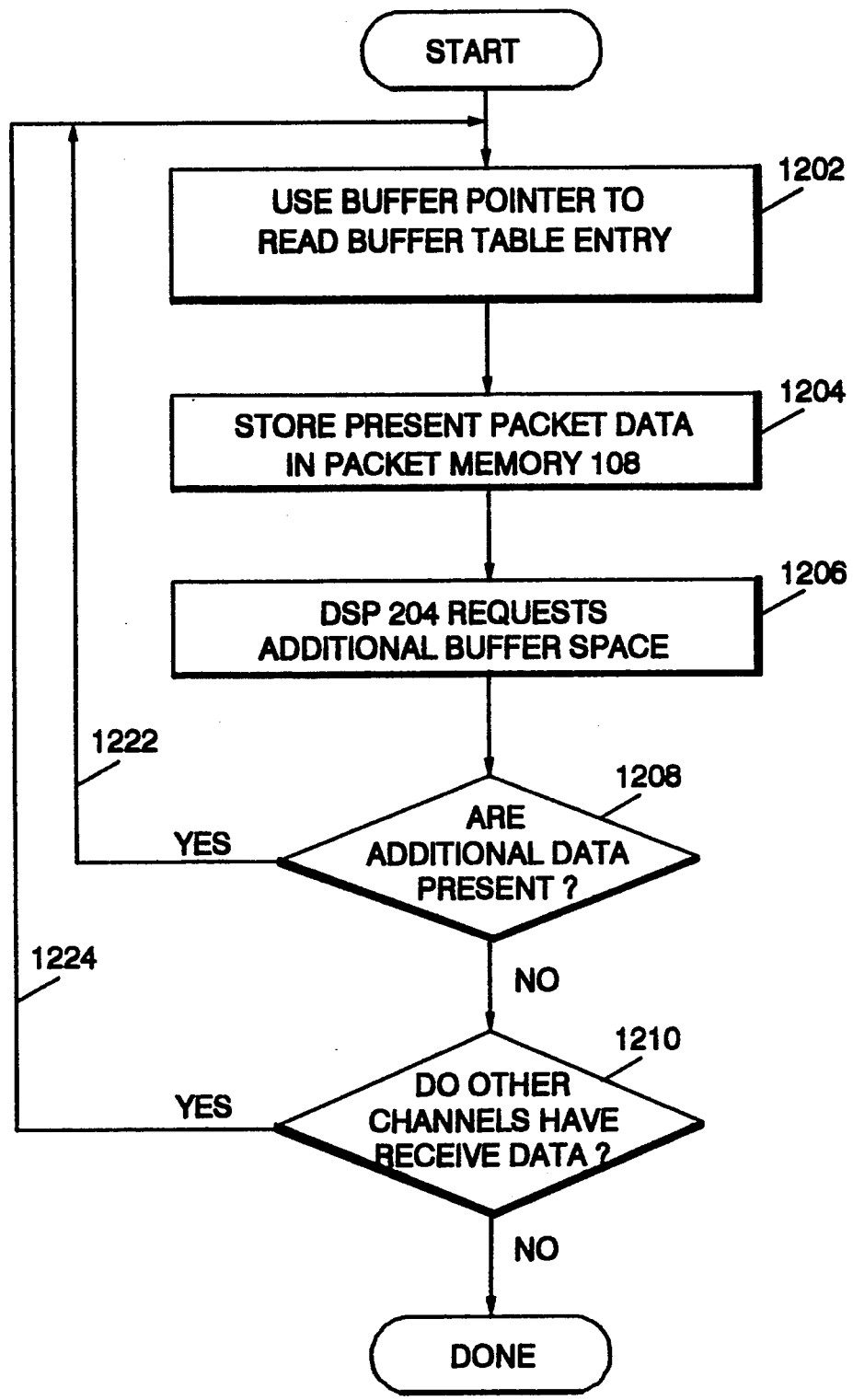
FIG. 12 is a flowchart illustrating the data-transfer steps involved with storing and enqueuing received packet data for a channelized adapter.

An alternative method for storing and enqueuing received packet data for a channelized adapter is illustrated in FIGS. 11 and 12. FIG. 11 is a flow chart illustrating the control steps for this alternative receive operation, and FIG. 12 is a flow chart illustrating the data transfer steps involved with this alternative method.

Referring now to FIGS. 1, 2, and 11, in a step 1102, DSP 204 requests that a block of memory be reserved in packet memory 108. Adapter manager 112 returns a pointer indicating the location of the block reserved. In a step 1104, DSP 204 stores the pointer in a channel FIFO in DSP RAM 208. In a step 1106, the block is reserved. In other words, it is set aside so that any RID associated therewith is free for use with an active block.

The operations of steps 1102 through 1106 are repeated so that two empty buffers are set aside for each channel. This is illustrated by a decision block 1108 and loop 1122.

Referring now to FIGS. 1, 2, and 12, in a step 1202, the first buffer pointer stored in the channel FIFO in DSP RAM 208 is used to read a buffer table entry 212 indicating where in the buffer received packet data for the first channel is to be stored. In a step 1204, if received packet data from the first channel is present in DSP RAM 208, the data are stored in packet memory 108 as described above with respect to FIG. 3.

If additional memory space is required to store the received packet(s), DSP 204 requests that additional buffer space be appended to that space already allocated to received packet data for that channel. This occurs in a step 1206.

If additional data are present in the receive queue for that channel, steps 1202 through 1206 are repeated until the last receive data are written to packet memory 108. This is illustrated by a decision block 1208 and loop 1222.

If one or more channels have pending receive data, steps 1202 through 1208 are repeated for each of these channels. This is illustrated by a decision block 1210 and loop 1224.

It should be noted that operations for multiple channels can be interleaved.

Although the above discussion described receive and transmit operations with respect to a channelized adapter, it will become apparent to a person skilled in the relevant art how these methods operate in the more general case of single channel operation.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A processor-based packet memory interface for controlling a transfer of packet data between multiple communications channels and packet memory in a communications adapter using one or more requestor IDS, wherein each requestor ID is a unique reference number identifying a transmit or receive process, comprising:

a processor, configured to reserve at least one block of memory in the packet memory, receive a pointer from the communications adapter, wherein said received pointer points to said at least one block of memory reserved by said processor, and to reserve said reserved block of memory to free the requestor ID so that the number of concurrent processes is not limited to the number of requestor ID's that can be handled by the communications adapter; and processor RAM, coupled to said processor, configured to store said pointer to said at least one block of memory in the packet memory and to temporarily store packet data for transfer between the communications channels and the communications adapter.

2. The processor-based packet memory interface of claim 1, further comprising control logic, coupled to said processor, for requesting access to a bus within the communications adapter.

3. The processor-based packet memory interface of claim 1, further comprising a bus, coupled to said processor, for transferring data and a pointer between said processor and the communications adapter.

4. The processor-based packet memory interface of claim 3, further comprising interface logic, coupled to said bus, configured to interface said bus to the communications adapter.

5. The processor-based packet memory interface of claim 4, further comprising control logic, coupled to said interface logic, configured to control said interface logic and for requesting access to a bus in the communications adapter.

6. A method for interfacing a plurality of communications channels to a communications adapter having packet memory and an adapter bus and using one or more requestor IDs, wherein each requestor ID is a unique reference number identifying a transmit or receive process, comprising the steps of:

(a) receiving packet data from a plurality of communications channels;

(b) storing received packet data in the packet memory, comprising the steps of
   (i) reserving a block of memory in the packet memory,
   (ii) receiving and storing a buffer pointer from the communications adapter, wherein said pointer points to said at least one block of memory reserved in said step (i), and
   (iii) reserving said reserved block of packet memory such that an associated requestor ID is available for use by the communications adapter to identify an alternative block of packet memory, such that packet data can be received on a greater number of communications channels than can be designated by the communications adapter using the requestor IDs;

(c) transferring packet data from the packet memory to a designated communications channel; and (d) using a buffer pointer to manage the transfer of packet data.

7. The method of claim 6, further comprising the step of repeating said steps (i) through (iii) as necessary to reserve at least two blocks of memory for each communications channel.

8. The method of claim 6, wherein said step (b) further comprises the steps of:

(iv) storing received packet data in a RAM;
(v) reading said buffer pointer received in said step (ii) to determine where in said packet memory said received packet data is to be stored;
(vi) storing said packet data in said packet memory at the location determined in said step (v); and
(vii) enqueuing said stored packet.

9. The method of claim 8, further comprising the steps of determining whether there are multiple buffers designated in said packet memory for storing said received packet data and if so, modifying a buffer table entry so said received packet data is stored in appropriate buffers.

10. The method of claim 6, wherein said steps (c) and (d) comprise the steps of:

(i) reading a buffer pointer in a transmit channel queue;
(ii) reading packet data out of packet memory and storing said packet data in a RAM; and
(iii) transmitting said packet data across a designated communications channel.

11. The method of claim 10, further comprising the steps of:

(iv) identifying a next buffer used to store additional packet data for a packet to which said packet data being read belongs;

(v) retrieving said additional packet data from said next buffer; and (vi) storing said additional packet data retrieved in said step (v) in said RAM.

12. The method of claim 6, wherein said steps (c) and (d) comprise the steps of:
 (i) receiving a transfer request from the communications adapter to transfer packet data;
 (ii) determining which one of a plurality of communications channels is to be used to transfer said packet data;
 (iv) storing a buffer pointer associated with said packet data in a channel FIFO for said one of a plurality of communications channels;
 (v) using said buffer pointer to locate a buffer containing said packet data; and
 (vi) transferring said packet data across said one of a plurality of communications channels.

13. The method of claim 6, wherein said steps (c) and (d) comprise the steps of:
 (i) reading said buffer pointer in a transmit channel queue in a RAM to locate a packet to be transmitted;
 (ii) reading data for said packet to be transmitted out of a packet memory location pointed to by said buffer pointer and storing said read data in a RAM;
 (iii) transmitting said read data across the communications channel.

14. The method of claim 13, further comprising the steps of:
 (iv) using a buffer table entry to determine a next buffer used to store additional data for said packet to be transmitted;
 (v) reading data from said next buffer and storing said additional data in the RAM.

15. A communications adapter capable of receiving packets of data from at least one of a plurality of communications channels, storing received packets, and transferring received packets to at least one of a plurality of communications channels, comprising:
 a packet memory, configured to store packets of data received from said plurality of communications channels;
 an adapter manager, coupled to said packet memory, configured to manage operations of the communications adapter;
 an adapter bus, coupled to said adapter manager, configured to transfer data to and from said packet memory; and
 a processor-based packet memory interface, comprising
  a processor, configured to reserve at least one block of memory in the packet memory, receive a pointer from the communications adapter, wherein said received pointer points to said at least one block of memory reserved by said processor, and to reserve said reserved block of memory to free the requestor ID, and
  processor RAM, coupled to said processor, configured to store said pointer to said at least one block of memory in the packet memory and to temporarily store packet data from transfer between the communications channels and the communications adapter.

16. The communications adapter of claim 15, wherein said processor-based packet memory interface, further comprising comprises a bus, coupled to said processor, for transferring data and a pointer between said processor and said packet memory.

17. The communications adapter of claim 16, further comprising interface logic, coupled to said bus and said adapter bus, configured to interface said bus to said adapter bus.

18. The communications adapter of claim 17, further comprising control logic, coupled to said interface logic, configured to control said interface logic and for requesting access to the communications adapter.

* * * * *